Aug. 2, 1927.
E. G. LANZI
1,637,577
CHOCOLATE DIPPING MACHINE
Filed June 14, 1922   10 Sheets-Sheet 7
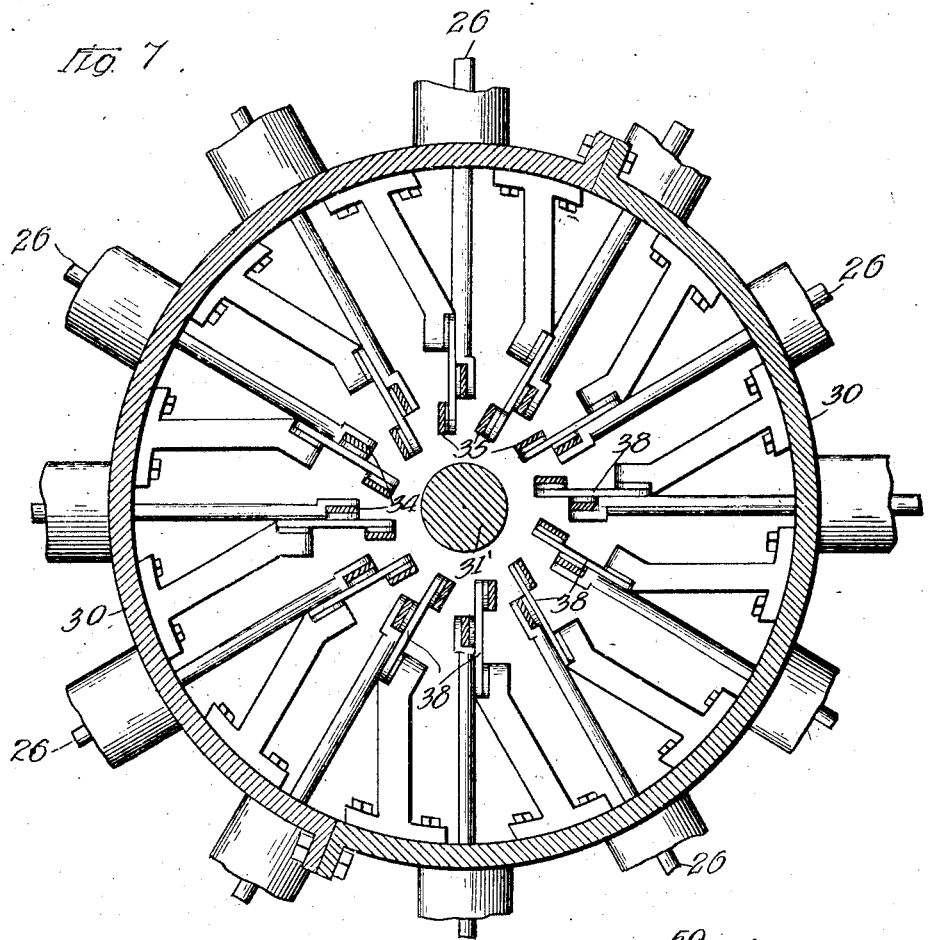
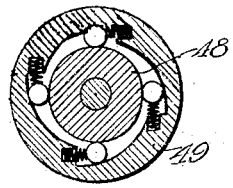
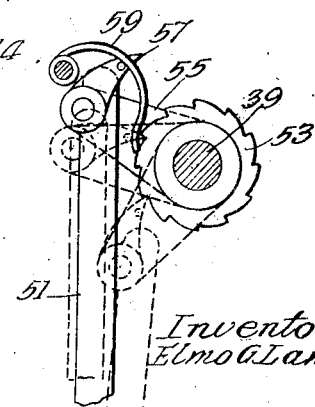

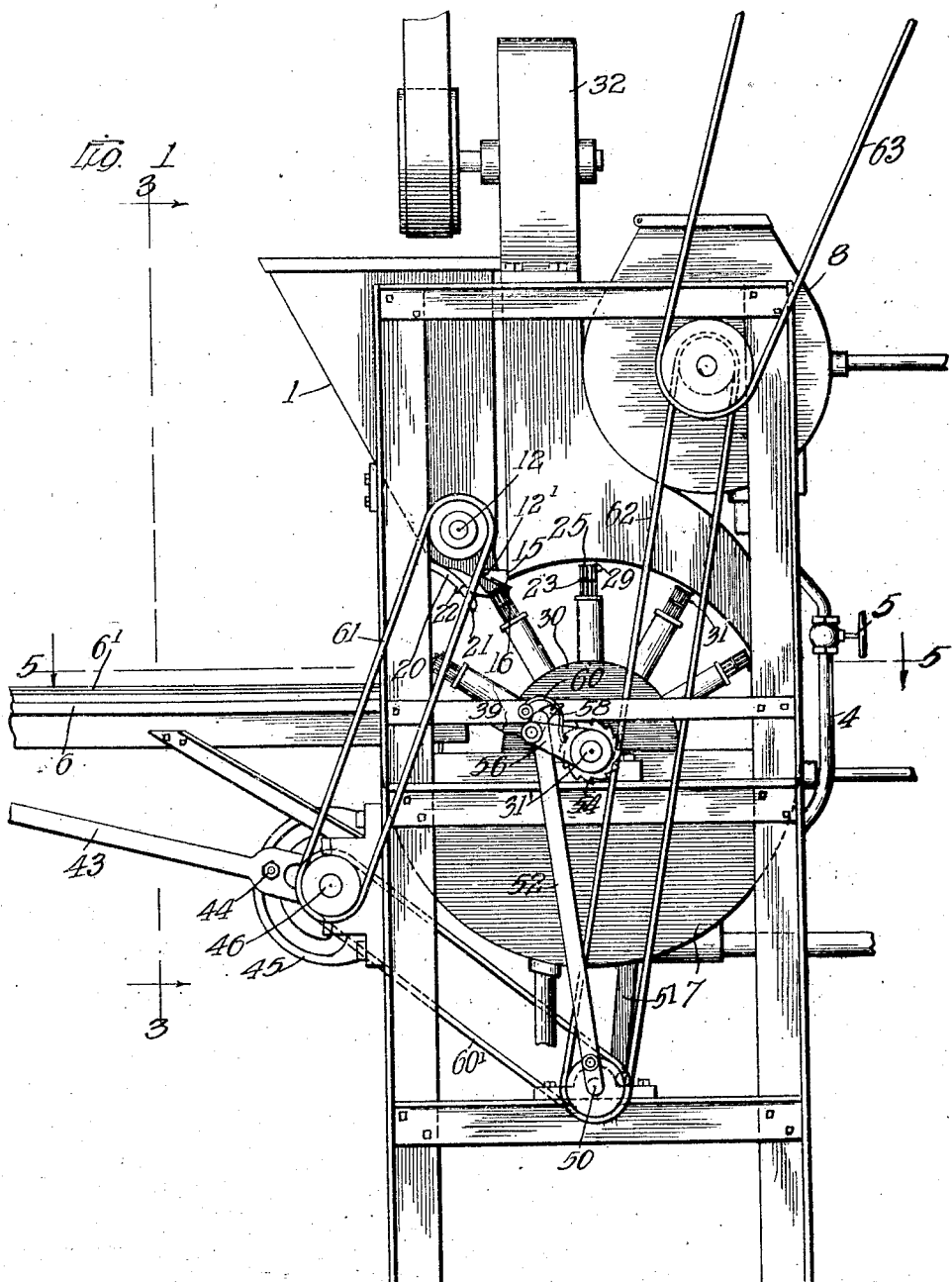

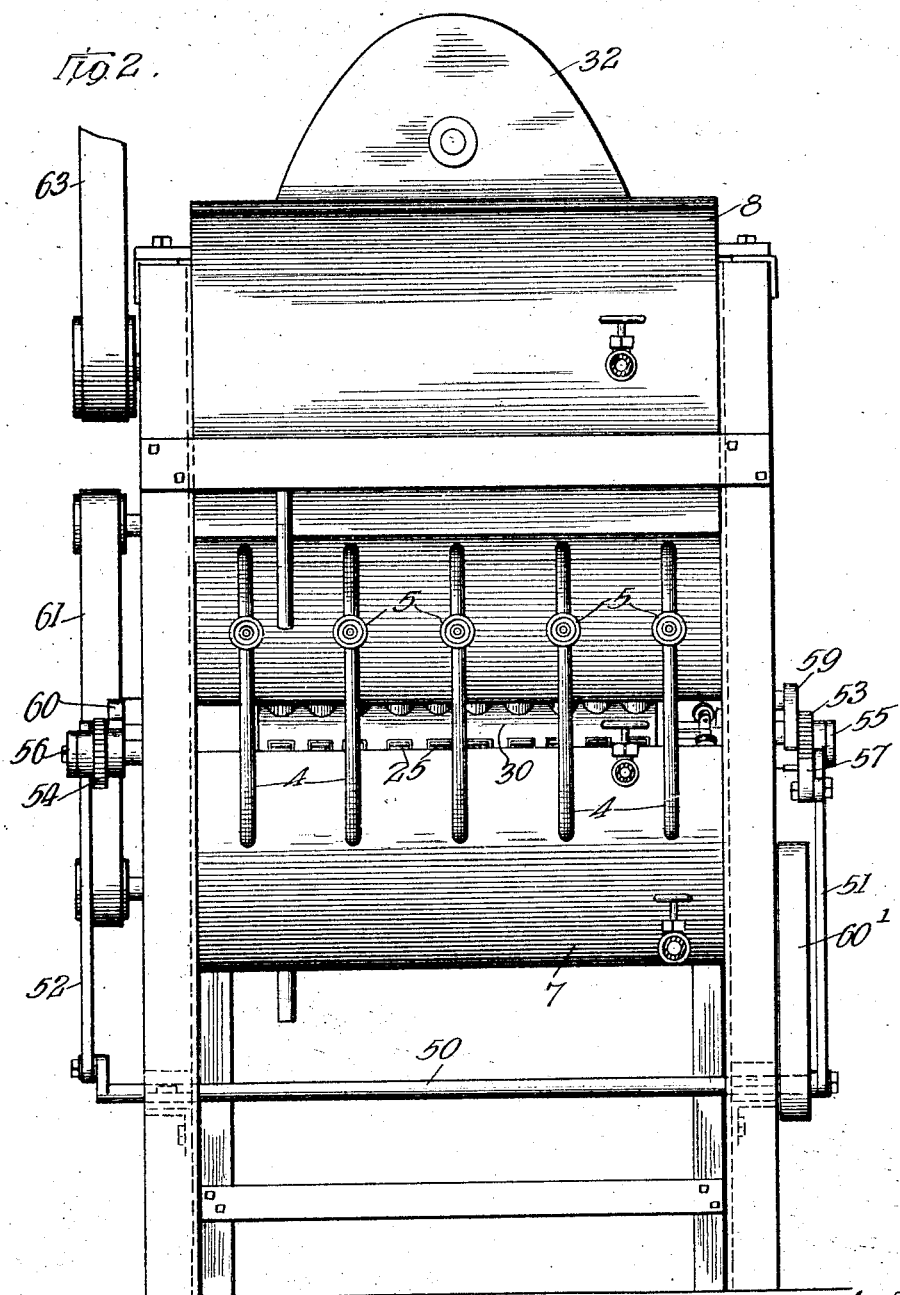

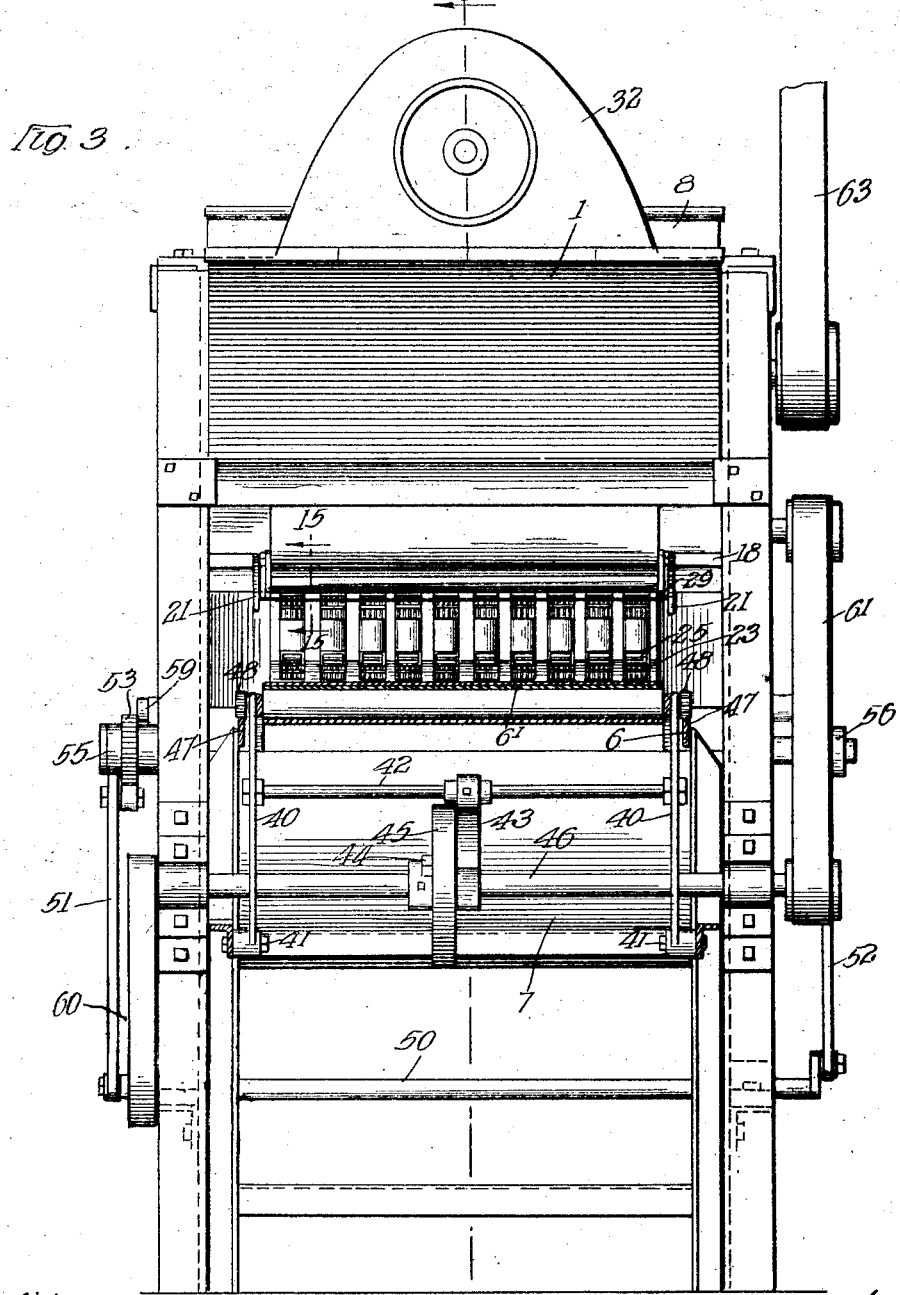

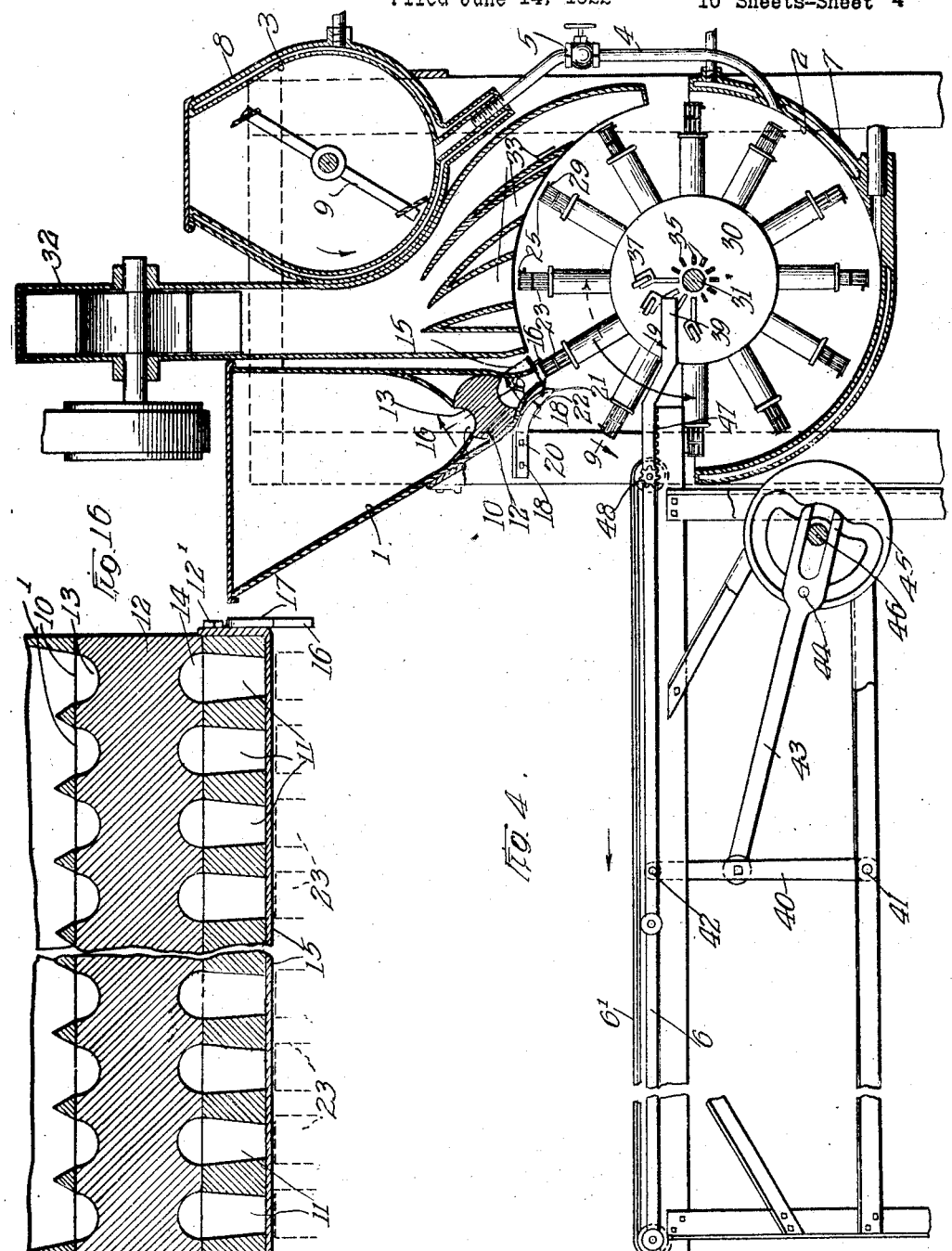

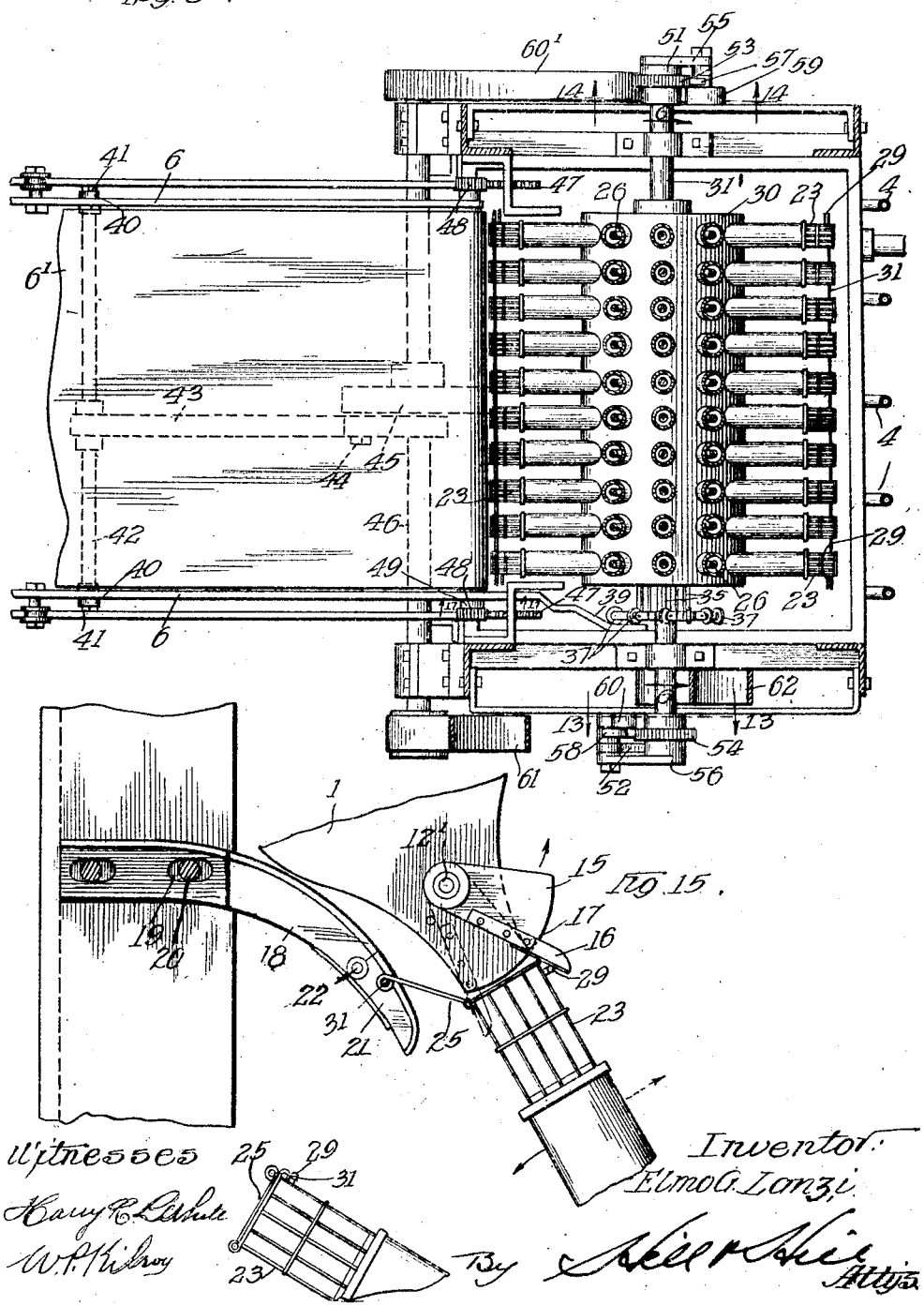

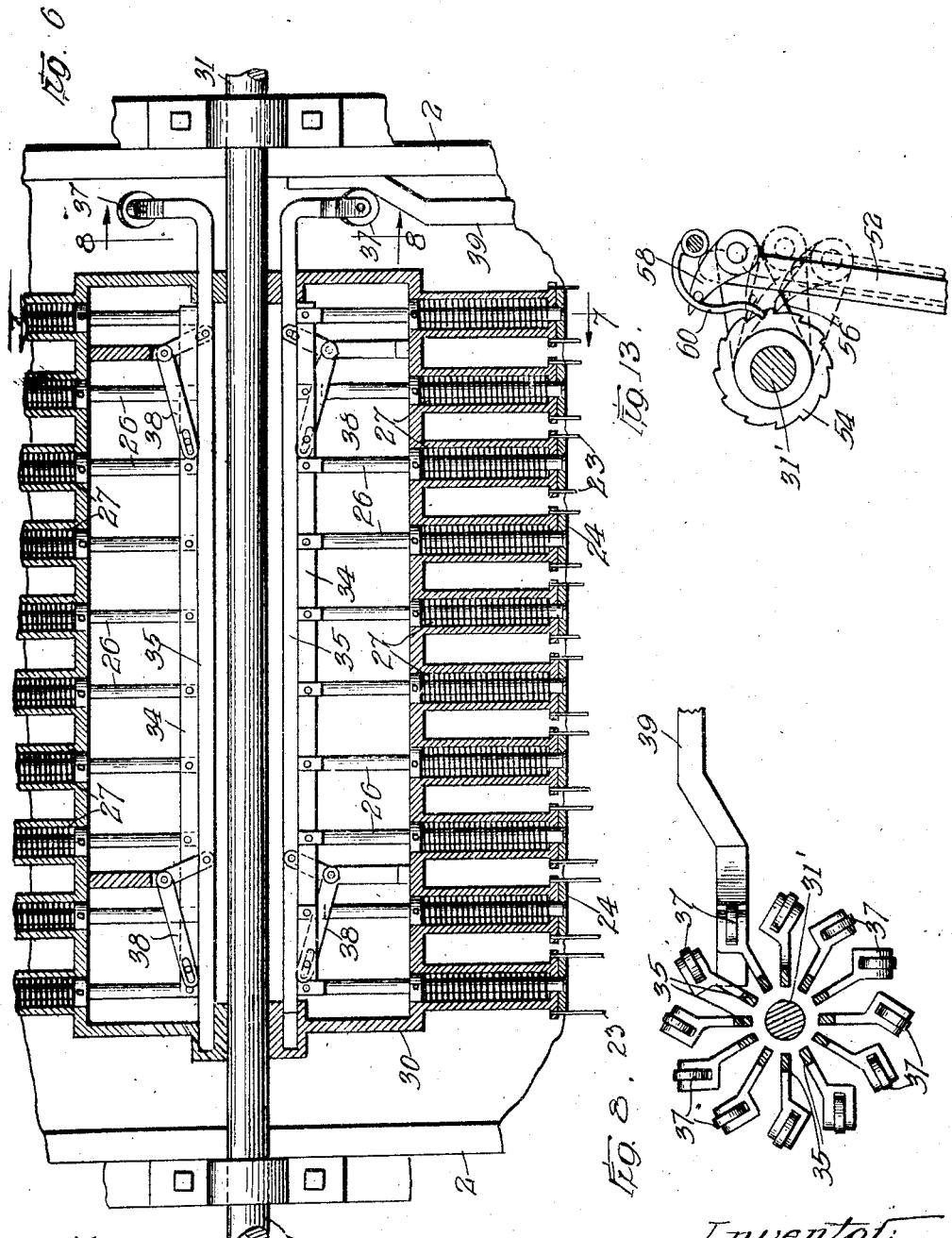

Aug. 2, 1927.

E. G. LANZI 1,637,577

CHOCOLATE DIPPING MACHINE

Filed June 14, 1922

Witnesses
Harry R. White
W. F. Kilroy

Inventor:
Elmo G. Lanzi
By Hill & Hill
Attys

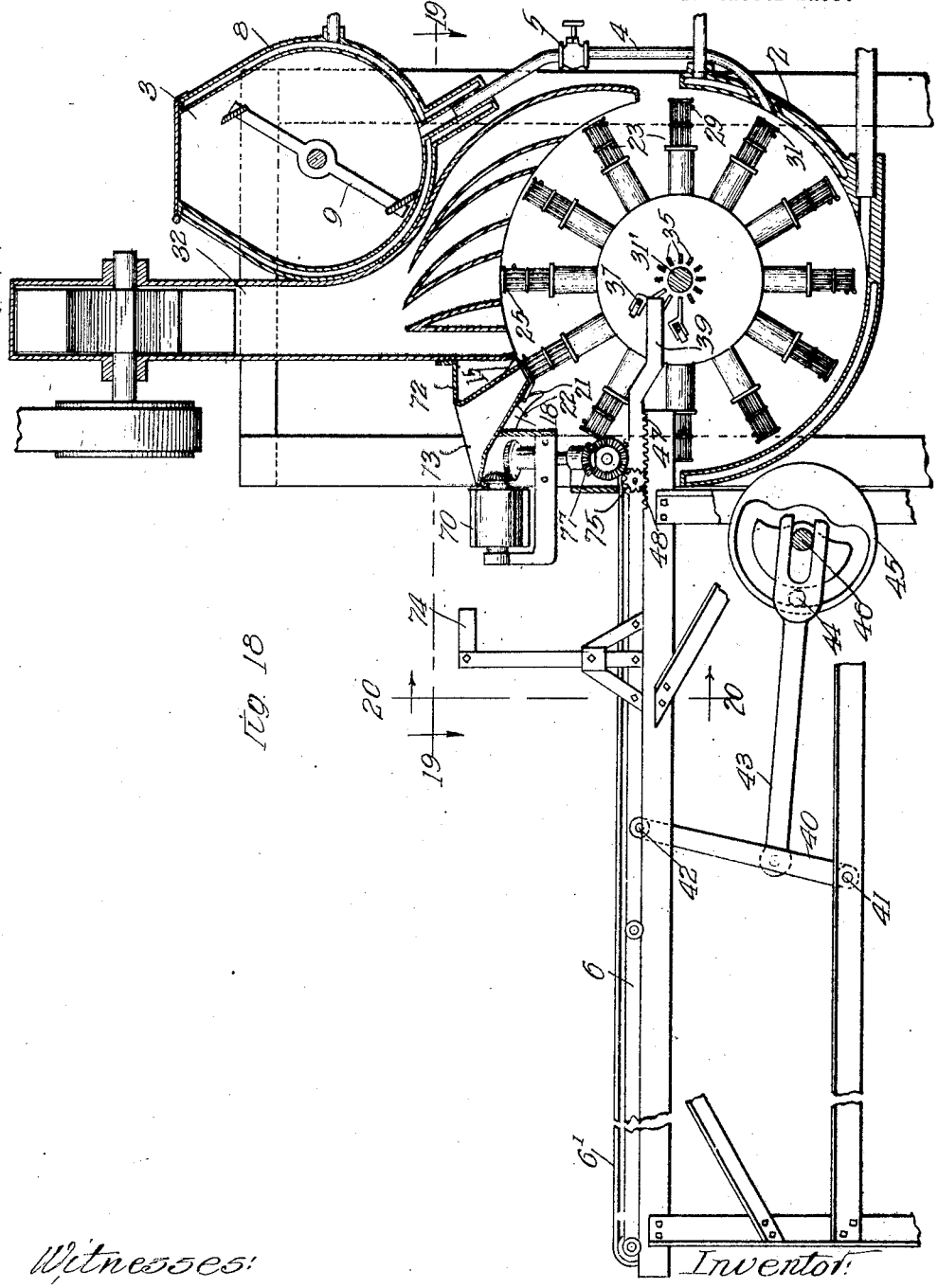

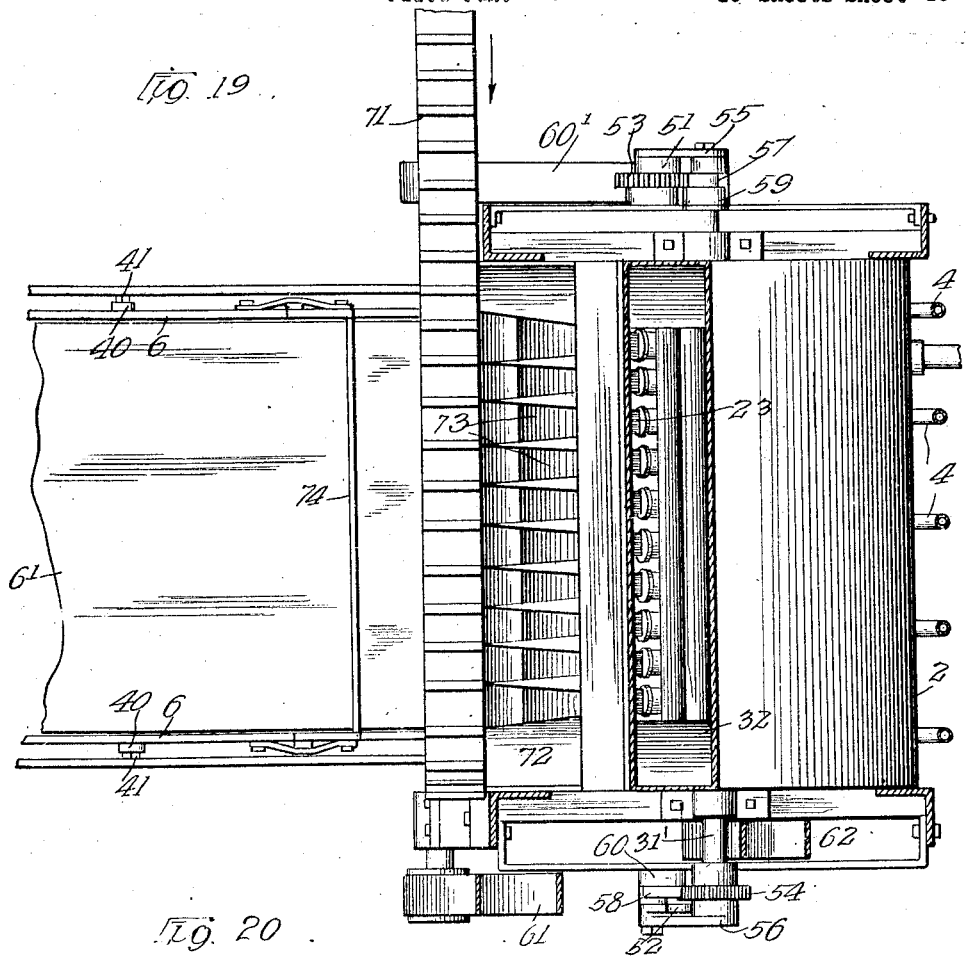

Patented Aug. 2, 1927.

1,637,577

UNITED STATES PATENT OFFICE.

ELMO G. LANZI, OF CHICAGO, ILLINOIS, ASSIGNOR TO BONUS CANDY CORPORATION, OF CHICAGO, ILLINOIS, A CORPORATION OF ILLINOIS.

CHOCOLATE-DIPPING MACHINE.

Application filed June 14, 1922. Serial No. 568,142.

My invention relates to improvements in chocolate dipping machines and relates more particularly to means for dipping articles, such as nuts of any kind or the like, either singly or in clusters, partially drying them and thence discharging them onto a table, wherefrom they may be removed for packing or the like.

My invention relates to an improved and continuous process for accomplishing the above, wherein all of the operations will be performed automatically, it being necessary only to keep the magazines or hoppers supplied with sufficient quantities of the materials worked with.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a vertical elevation of my device;

Fig. 2 is a rear elevation thereof;

Fig. 3 is a section taken substantially on the line 3—3 of Fig. 1;

Fig. 4 is a section taken substantially on the line 4—4 of Fig. 3;

Fig. 5 is a section taken substantially on the line 5—5 of Fig. 1;

Fig. 6 is a section taken substantially on the line 6—6 of Fig. 5;

Fig. 7 is a section taken substantially on the line 7—7 of Fig. 6;

Fig. 8 is a section taken substantially on the line 8—8 of Fig. 6;

Fig. 13 is a section taken substantially on the line 13—13 of Fig. 5;

Fig. 14 is a section taken substantially on the line 14—14 of Fig. 5;

Fig. 15 is a section taken substantially on the line 15—15 of Fig. 3;

Fig. 16 is a section taken substantially on the line 16—16 of Fig. 4;

Fig. 17 is a section taken substantially on the line 17—17 of Fig. 5;

Fig. 18 is a section similar to that shown in Fig. 4 and illustrating a modification thereof;

Fig. 19 is a section taken substantially on the line 19—19 of Fig. 8; and

Fig. 20 is a section taken substantially on the line 20—20 of Fig. 8.

Figure 9:
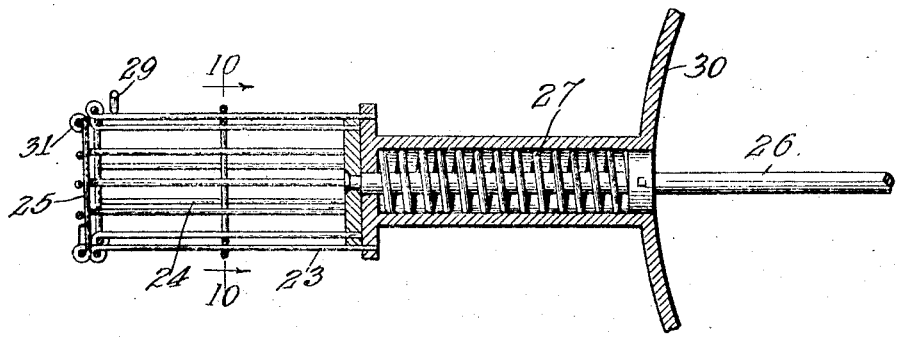
Fig. 9 is a section taken substantially on the line 9—9 of Fig. 4.
Figure 10:
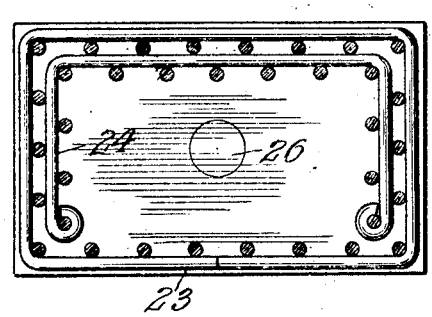
Fig. 10 is a section taken substantially on the line 10—10 of Fig. 9.
Figure 11:
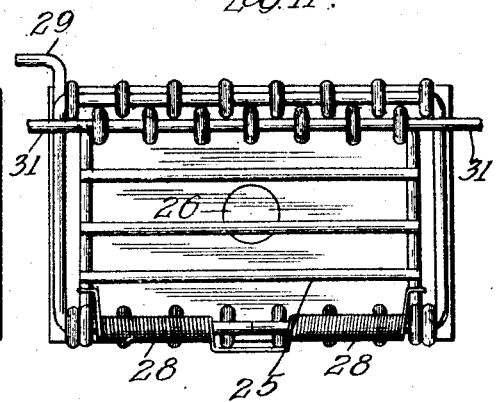
Fig. 11 is an end view of the parts shown in Fig. 9.
Figure 12:
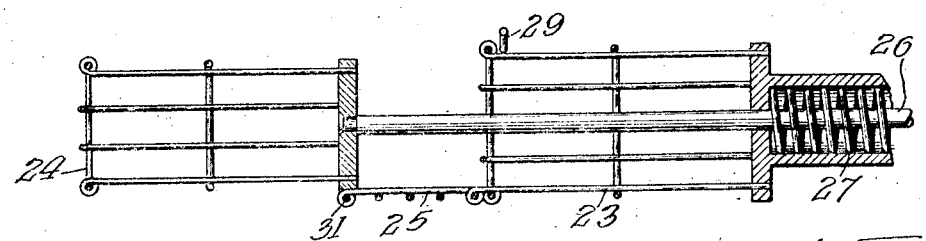
Fig. 12 is a section similar to that shown in Fig. 9, but with the parts in their ejecting position.

In the drawings, wherein I have illustrated the preferred embodiments of my invention, there is illustrated a mechanism for measuring out a predetermined quantity of articles from a hopper or reservoir 1, moving said articles through a dipping or coating vat 2, supplied with a suitable material, such as chocolate glacé, or the like from a reservoir 3 connected therewith by one or more pipes 4, having controlling valves 5, said dipped articles coming into the path of air or the like under pressure, whereby the excess coating is blown off and returned into the dipping vat, and the dipped and partially-cooled articles thence discharged onto a movable element of a delivery table 6, all of the operations of the cycle being automatic and continuous, as will be more clearly hereinafter described.

The dipping vat 2 may be kept heated by a steam jacket or the like, as at 7, and the reservoir 3 may be likewise maintained at any desired temperature by a jacket 8 or the like. A stirrer 9 may be arranged in the reservoir 3, either continuously operative or intermittently operative as preferred to keep the contents thereof at the desired consistency throughout.

The hopper 1 is arranged to extend substantially the full width of the machine, with a series of adjacent openings 10—10 through a wall spaced from its bottom end and forming a false bottom. The real bottom of the hopper has a series of openings 11—11 therethrough spaced apart a distance equal to the distance between the adjacent openings 10—10, and so as to register therewith. Intermediate the series of openings 10 and 11 is a feeding roll or member 12, preferably in the form of a cylinder having a series of arcuate concavities or recesses 13 and 14 respectively along the diametrically opposite sides thereof, these concavities being equal and spaced apart a distance equal to the spacings between the openings 10—10 and 11—11, so as to register therewith, alternately.

Referring to Figs. 4 and 16, it will be noted that when there is a quantity of articles in the hopper 1, a rotation of the roll 12 through a half-revolution will carry those articles now in the concavities 13, to the position now occupied by the concavities 14, so that they may be discharged into suitable receptacles. Thus only a predetermined quantity of the articles will be discharged at each half revolution of the roll 12, the quantity discharged dependent upon the size of the concavities 13 and 14.

At the lower end of the hopper and closing the openings 11 is a gate or door 15, with lugs 16 hinged thereto, as at 17, and at each side of the machine is arranged a camway or track 18, adjustably secured to a stationary part of the frame by means of elongated slots 19 therethrough, through which fastening bolts 20 are adapted to be positioned. The free ends 21 of the guides 18 are hinged to the stationary part, as at 22, for a purpose to be hereinafter described.

The means for receiving the articles to be dipped and for carrying said articles through the dipping vat comprises a number of carriers or cages, each made up of a stationary outer cage 23 and an inner cage 24 completely slidable thereinto. These cages may be of any desired size or shape dependent upon the particular products to be dipped. A cover 25 is hinged to the stationary cage 23 so as to extend across the tops of both the inner and outer cages when said cages are in the position shown in Fig. 9, and thus prevent the articles in said cages from accidentally dropping out of the cages. The cages may be of any preferred or desired shape, and in the drawings they have been shown as rectangular in cross section. Each movable cage has a bar 26 extending therefrom, and springs 27 are arranged to retract the cages 24 to the closed position, as shown. The cover 25 is spring-hinged, as at 28, so that the inner cage must be opened against the pressure of the spring of the cover.

Projecting from each of the cages 23 is an abutment or lug 29 engageable with the part 16 of the door of the hopper, as shown in Fig. 15. The cages are arranged in a plurality of series, radially extending, and the adjacent series circumferentially spaced apart, each series extending in a line and having one cage for each discharge opening 11 of the hopper. The stationary parts of the cages are secured to a rotatable drum 30 having a drive shaft 31′. Extending across the covers 25 of each line or series of cages is a bar or rod 31, engageable with the guide or camway 18—21, as shown in Fig. 15. It will be noted that as the cages move forwardly in the direction indicated by the full line arrows in Figs. 4 and 15, the lugs 29 and the bar 31 along each series will engage the parts 16 and 21 respectively, but as these parts are hinged, the cage may pass without interference. Upon the backward movement of the cages, that is, in the direction indicated by the dotted-line arrows in Figs. 4 and 15, the bar 31 will engage the portion 21 of the stationary guides to pull open or pivot all of the covers 25 in line with the discharge openings of the hopper 1 about their spring hinges 28, the lugs 29 of said series engaging the extensions 16 of the doors 15 to swing said doors to the position shown in Fig. 15, and permit the articles at the bottom of the hopper to be discharged simultaneously into all of the open cages. The subsequent forward motion of the cages will permit the hopper doors and cage covers to close and thus confine the articles within the cages, so that they may be moved through the dipping vat and discharged onto the table 6 in a manner to be hereinafter described.

A fan or blower 32 is arranged intermediate the dipping vat and the delivery table, and has passageways 33 therethrough at circumferentially spaced points in the path of rotation of the cages to impel air or the like under pressure past the dipped articles in the cages and thus wipe off or remove any excess material or coating returning it to the vat, at the same time partially cooling the dipped articles.

Each series of rods 26 extending radially into the drum 30 are connected together by a bar 34 so as to be moved simultaneously, said bar arranged substantially parallel to the shaft 31′, as shown more clearly in Figs. 6, 7 and 8. These bars 34 are slidably engaged by bars 35, arranged substantially parallel therewith and adjacent thereto, and having cam rollers 37 at one of their ends. The bars 35 are slidable transversely of the plungers 26, and are operably connected to the bars 34 by links 38 or the like, so that a sliding movement of the bar 35 will cause all of the plungers 26 of a series to be reciprocated to open or close the covers of the cages controlled thereby. The cams or rollers 37 are engageable in succession by a cam bar 39, carried by the movable frame work of the table 6, so that whenever the table is moved inwardly toward the shaft 31′, those doors of the series of cages controlled by the cam in contact with the member 39 will be actuated.

It will be noted in Fig. 4 that the movable part of the table 6 is normally out of the path of rotation of the cages. In order to bring the table into the path of the cages, so that the articles therein may be discharged onto the table, there is arranged a rocking lever 40, pivoted at its ends 41 and 42 to a stationary part and to the movable part of the table respectively, and to which is pivotally connected a connecting rod 43, carrying a pin 44. A grooved cam 45 is driven by a shaft 46, the pin 44 riding in the cam groove so that the rod 43 will be reciprocated in a predetermined manner to reciprocate the frame of the table 6. Rack teeth 47 are arranged at the inner ends of the stationary frame work of the table, and a pinion 48, engageable with said rack teeth is rotatably secured to the movable frame work of the table, at one or both sides thereof.

An overrunning clutch 49 is secured to the shaft of the pinion 48 and serves as one of the rollers for a belt, or the like, 6' moving with the table 6. In this manner the reciprocation of the movable framework carrying the belt will cause the belt to travel a short distance in one direction only of its to-and-fro movement or, in other words, the belt will travel forwardly in a step-by-step movement.

The rotative movement of the drum 30, carrying the cages, is not a continuous one, but is alternately forward and backward, the forward movement being through a distance equal to twice the backward movement. Assuming that the cages of any given series are being filled, as shown in Fig. 4, then the next movement of the drum will be forward through the distance indicated by the full-line arrow shown, the movement of the table being so synchronized with the movement of the drum that the table will begin to move inwardly toward the cages immediately after the series of cages just filled have passed below the level of the table, the table arriving at its innermost portion, at the completion of the forward movement of the filled cages, so that the filled cages will then be at a point forward in travel beyond the hopper a distance equal to twice the distance between adjacent series of cages. The series of cages then immediately above the table 6 in its innermost position will then discharge, due to the action of the cam rod 39 cooperating with the moving parts of the cages to eject or discharge the dipped and partially cooled contents onto the table, whereupon the table is then moved automatically to the full-line position shown. The drum 30 is now moved backwardly or rearwardly, so that the cages that have just been emptied come in registry with the discharge openings of the hopper, the covers of said cages being opened in unison in the manner hereinbefore described, whereupon the cages are filled and are once more moved forwardly a distance equal to twice the spacing between adjacent series of cages. As there are twelve series of cages shown, the forward movement in the present instance will be for two-twelfths of the revolution, and the backward movement will be for one-twelfth of a revolution.

The mechanism for effecting the forward and backward rotation of the drum comprises a rotatable crank shaft 50 secured adjacent the bottom of the framework of the mechanism and having an arm 51 and 52, respectively, pivoted at one end to the crank shaft 50, and pivoted at the upper ends to links 55 and 56 thereof, said links connected to the shaft 31 of the drum.

Arranged on the shaft 31', adjacent the links 55 and 56, are ratchets 53 and 54 respectively, the teeth of said ratchets extending in opposite directions, so that the ratchets will actuate the shaft 31' alternately in opposite directions. Pivotally secured to the rods 51 and 52 are pawls 57 and 58 respectively, engageable with the ratchets 53 and 54 respectively. Springs 59 and 60 respectively engage the pawls 57 and 58 respectively, said springs fastened at one end to a stationary part of the machine. Thus it will be seen that when the rods 51 and 52 are moved in unison upwardly, that the pawl 57 will ride over the ratchet 53, while the pawl 58 will engage the ratchet 54 to move it through one-twelfth of a revolution, thereby rotating the drum 30 backwardly through one-twelfth of a revolution. Upon the downward stroke of the rods 51 and 52 the pawl 58 will override the ratchet 54, while the pawl 57 will engage the ratchet 53 to rotate the drum forwardly two-twelfths of a revolution.

The shafts 50 and 46 are drivingly connected by means of belt 60, or by any other suitable means, and the shaft 46 is connected to the roller 12 by means of a belt 61. A belt 62 connects the shaft 50 with the stirrer shaft, all of said shafts receiving their drive from the belt 63. In the form shown, the blower 32 is independently driven, although it is obvious that the blower may be driven by suitably belting or gearing the shaft from the belt 63. Thus it will be seen that the feeding means, table-operating means and drum-operating means will all be driven in unison and synchronized so as to act at the proper intervals.

All of the action of the mechanism is automatic, it being necessary only for the operator to watch that the desired amount of coating material and articles to be coated are provided and to remove the dipped articles from the traveling belt or table at intervals.

In the modification shown in Figs. 18 to 20 inclusive, the hopper and feeding arrangement is slightly different than in the previously described modification, in order to accommodate different types of articles to be coated. In the present instance, articles such as large bars of candy or the like are to be coated, and these bars are arranged adjacent one another upon the upper surface of an endless belt or conveyor 70 mounted upon suitable rollers. The belt has a number of lugs 71 thereon, spaced apart a distance equal to substantially the width of the articles to be dipped. The hopper 72 extends substantially the width of the machine, and comprises a number of outwardly flared ducts 73 leading from adjacent the conveyor 70 and adapted to discharge into all of the cages 23 of an entire series, said cages proportioned to the shape desired. The ducts 73 are flared so as to more accurately center and guide the articles in their feeding movement to the cages.

A member 74 is arranged so as to be movable laterally of the conveyor 70 to sweep off the articles placed thereon into the ducts 73, the member 74 secured to the movable framework of the delivery table 6, as shown in Figs. 18, 19 and 20, wherein it will be obvious that all of the articles on the conveyor in registry with the duct 74 may be swept thereinto.

The cages 23 are opened in the same manner as in the previous modification, and in order to operate the conveyor 70 at predetermined intervals there is a rack 75 arranged to move with the part 39 and engageable with a pinion 76, which is connected through gearing 77 to drive the conveyor 70. As in the previous modification, an overrunning clutch may be provided so that the movable table 6 will have a step by step motion, and so that the conveyor 70 will be driven in a step by step motion in only one direction, these overrunning clutches not being shown.

The gearing driving the conveyor 70 is so arranged that it will drive said conveyor at a higher speed than the speed of the member 74, and will come to rest after its motion before the member 74 engages the articles arranged thereon.

The dipping and discharging of the articles coated is substantially the same as that previously described, and no detailed explanation is thought necessary at this point. As the articles are moved forwardly on the conveyor into registry with the duct 73 and have come to rest, the cages in registry with the ends of the ducts being open, the member 74 will discharge the articles through said ducts into said cages and move backwardly to its inoperative position. Upon the next forward feeding movement the belt 70 will be moved through the required distance and the operation of discharging will be repeated.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described and in combination, a hopper, carriers, a movable delivery table normally out of the path of movement of said carriers, and a plurality of means for feeding articles from said hopper into said carriers, dipping said filled carriers, forcibly ejecting said articles from said carriers, and for moving said table into the path of the carriers at predetermined intervals so that the dipped articles may be discharged thereon.

2. In a device of the character described and in combination, a hopper, a plurality of movable carriers, covers for said carriers, means for simultaneously moving a number of said covers into inoperative positions with respect to the carriers, means for feeding articles from the hopper into said carriers, means for dipping the filled carriers, and means for automatically releasing said articles from the carriers after dipping them.

3. In a device of the kind described and in combination, a hopper, carriers, and a series of means for feeding articles from said hopper into said carriers and confining them therein, dipping said filled carriers and for forcibly ejecting said confined articles after dipping.

4. In a device of the character described and in combination, a plurality of carriers, covers for said carriers, means for feeding articles into said carriers, means for simultaneously moving some of said covers to an open position and moving other of said covers to a closed position with respect to the carriers, means for dipping the filled carriers, and movable means for automatically releasing said articles from the carriers after dipping them.

5. In a device of the kind described and in combination, a hopper, carriers, and a series of means for feeding articles from said hopper into said carriers, dipping said filled carriers and for discharging the dipped articles therefrom, each of said carriers comprising an outer cage, an inner cage movable thereinto, a cover, and a plunger for moving said inner cage to open said cover and eject the contents therefrom.

6. In a device of the kind described and in combination, a movable table, a hopper, carriers, and a plurality of means for feeding articles from said hopper into said carriers, dipping said filled carriers and for discharging the dipped articles therefrom, each of said carriers comprising an outer cage, an inner cage movable thereinto, a cover, and a cam-operated plunger actuated by said table for moving said inner cage to uncover it and eject the dipped contents therefrom.

7. In a device of the kind described and in combination, a dipping vat, holding cages, a delivery table, means for feeding articles into said cages, means for moving said cages through said vat, means for forcibly ejecting said articles from said cages, and cyclic timing means for actuating the feeding means, the ejecting means and the table.

8. In a device of the kind described and in combination, a hopper, a dipping vat, a plurality of series of holding cages, a delivery table movable into and out of the path of said cages, means for feeding articles from the hopper simultaneously into all the cages of each series in rotation, means for moving said cages through said vat, and means for forcibly ejecting said articles from the cages.

9. In a device of the kind described and in combination, a hopper, a dipping vat, a plurality of series of holding cages, a delivery table, means for feeding the articles from the hopper simultaneously to all the cages of a series, means for moving the filled series through the vat, and means for forcibly discharging the dipped articles simultaneously from all the cages of said series onto said table.

10. In a device of the kind described and in combination, a hopper, a dipping vat, a plurality of series of holding cages, a delivery table, means for automatically feeding articles from the hopper simutaneously to all the cages of a series, means for discharging the dipped articles onto said table simultaneously from all the cages of a series, and means for moving said cages alternately forwardly and backwardly, each forward movement being twice as far as each backward movement.

11. In a device of the kind described and in combination, a hopper, a dipping vat, a plurality of circumferentially spaced series of cages, a delivery table, means for automatically feeding artices from said hopper simutaneously into all of said series of cages, means for dipping the filled cages simultaneously in said vat, means for discharging the dipped articles simultaneously onto said table, and means for moving all of the cages in unison forwardly a predetermined distance to discharge the dipped contents of one series of cages onto said table and thence backwardly half of said distance to fill said emptied series of cages.

12. In a device of the kind described and in combination, a hopper, a dipping vat, a plurality of circumferentially spaced series of cages, a delivery table, means for automatically feeding articles from said hopper simultaneously into all of said series of cages, means for dipping the filled cages in said vat, means for discharging the dipped articles onto said table, means for moving all of said cages in unison forwardly a predetermined distance to discharge the dipped contents of one series of cages onto said table and then backwardly half of said distance to fill said emptied series of cages, and means for moving said table in synchronism with the forward movement of said cages to receive said discharged articles thereon.

13. In a device of the kind described and in combination, a hopper, a dipping vat, a plurality of circumferentially spaced series of cages, a delivery table, means for automatically feeding articles from said hopper simultaneously into all of said series of cages, means for dipping the filled cages in said vat, means for discharging the dipped articles onto said table, means for moving all of said cages in unison forwardly a predetermined distance to discharge the dipped contents of one series of cages onto said table and thence backwardly half of said distnace to fill said emptied series of cages, and means for moving said table into the path of the dipped cages in synchronism with the forward movement of said cages to receive said discharged articles thereon and out of the path of said cages in synchronism with their backward movement.

14. In a device of the kind described and in combination, a dipping vat, a plurality of means for dipping articles into said vat, means for rotating said plurality of means in a step by step manner, and means for blowing off excess coating material from said dipped articles comprising a fan, and passages leading from the fan to positions that said plurality of said feeding means assume when stationary.

In testimony whereof, I have hereunto signed my name.

ELMO G. LANZI.